(12) United States Patent
Grimsrud (10) Patent No.: US 6,546,437 B1
(45) Date of Patent: Apr. 8, 2003

(54) COMMUNICATION BETWEEN A COMPUTER AND A PERIPHERAL WITH LEGACY FAILURE CONTROL MECHANISM

(75) Inventor: Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/272,724

(22) Filed: Mar. 18, 1999

(51) Int. Cl.[7] .................. G06F 13/14; G06F 13/20; G06F 13/10
(52) U.S. Cl. ............... 710/8; 710/14; 710/62; 710/64; 709/228; 709/247
(58) Field of Search .................. 710/62, 64, 8, 710/14; 709/228, 247

(56) References Cited

U.S. PATENT DOCUMENTS

| | | | | |
|---|---|---|---|---|
| 4,386,416 A | * | 5/1983 | Giltner et al. | 364/900 |
| 5,694,618 A | * | 12/1997 | Hibino | 395/866 |
| 5,699,524 A | * | 12/1997 | Ooishi et al. | 395/200.18 |
| 5,898,886 A | * | 4/1999 | Hewitt | 395/890 |

* cited by examiner

*Primary Examiner*—Jeffrey Gaffin
*Assistant Examiner*—Rehana Perveen
(74) *Attorney, Agent, or Firm*—Fish & Richardson P.C.

(57) ABSTRACT

A request for information is received at a peripheral from a computer. A reply to the request is transmitted that will cause a computer using a first computer/peripheral scheme not to use the peripheral.

29 Claims, 11 Drawing Sheets

COMMUNICATION BETWEEN A COMPUTER AND A PERIPHERAL WITH LEGACY FAILURE CONTROL MECHANISM

BACKGROUND

This invention relates to communication between a computer and peripheral.

Computers often use peripheral devices such as hard disk drives and CD-ROM drives for data storage. A peripheral may include what amounts to a small computer of its own. This small embedded computer can control a variety of electronic and mechanical functions involved in data storage and retrieval such as controlling the positioning of a disk head that reads and writes data from a hard disk. The small peripheral computer can also handle software-oriented functions such as data caching and computer/peripheral communication.

Communication between a computer and peripheral is often governed by an industry standard such as the ATA standard (AT Attachment with Packet Interface Standard, Working Draft, Revision 18, published Aug. 19, 1998, available at ftp://fission.dt.wdc.com/pub/standards/x3t13/project/d01153r18.pdf). These standards can define the format, content, and sequence of messages exchanged between a computer and peripheral. These standards enable a computer to interact uniformly with a wide variety of peripherals made by different manufacturers.

SUMMARY

In general, in one aspect, the invention features receiving a request at a peripheral for information describing at least one data-storage characteristic of the peripheral, and, without error, transmitting a reply including information falsely describing at least one data-storage characteristic.

In general, in another aspect, the invention features receiving a request at a peripheral from a computer for information, and transmitting a reply to the request that will cause a computer using a first computer/peripheral scheme not to use the peripheral and a computer using a second computer/peripheral scheme to use the peripheral.

In general, in another aspect, the invention features transmitting a request for information to a peripheral from a computer conforming to a first computer/peripheral scheme to a peripheral conforming to a second computer/peripheral scheme, and receiving a reply from the peripheral in response to the request that includes information that causes the computer not to use the device.

In general, in another aspect, the invention features a computer program product, disposed on a computer readable medium, that includes instructions that cause a processor to transmit a request for information to a peripheral, and based on a reply received from the peripheral, determine whether the peripheral conforms to a first or second computer/peripheral scheme.

DETAILED DESCRIPTION

The electronics in traditional Integrated Device Electronics (IDE) peripheral devices add to the devices' cost and complexity. In proposed computer/peripheral schemes, functions traditionally performed by the peripheral electronics (e.g., caching) may be transferred (e.g., uploaded from the peripheral) to a computer for execution. Consequently, the peripheral can use cheaper components (e.g., a less sophisticated processor and/or less memory) and have a simpler design. Computers that do not use one of the proposed schemes (e.g., legacy computers) may not behave predictably when coupled to peripherals (i.e., non-legacy peripherals) designed for use with one of the proposed schemes. For example, a legacy computer may assume a coupled peripheral will handle data caching while the peripheral may assume the caching function will be off-loaded to the host. As a result, data caching may not be performed at all. This and other incompatibilities may cause problems ranging from poor and erratic performance to inoperability.

In one embodiment in accordance with the invention a mechanism is provided that both identifies non-legacy peripherals to non-legacy computers and reduces unpredictable behavior when a non-legacy peripheral is coupled to a legacy system.

Figure 1:
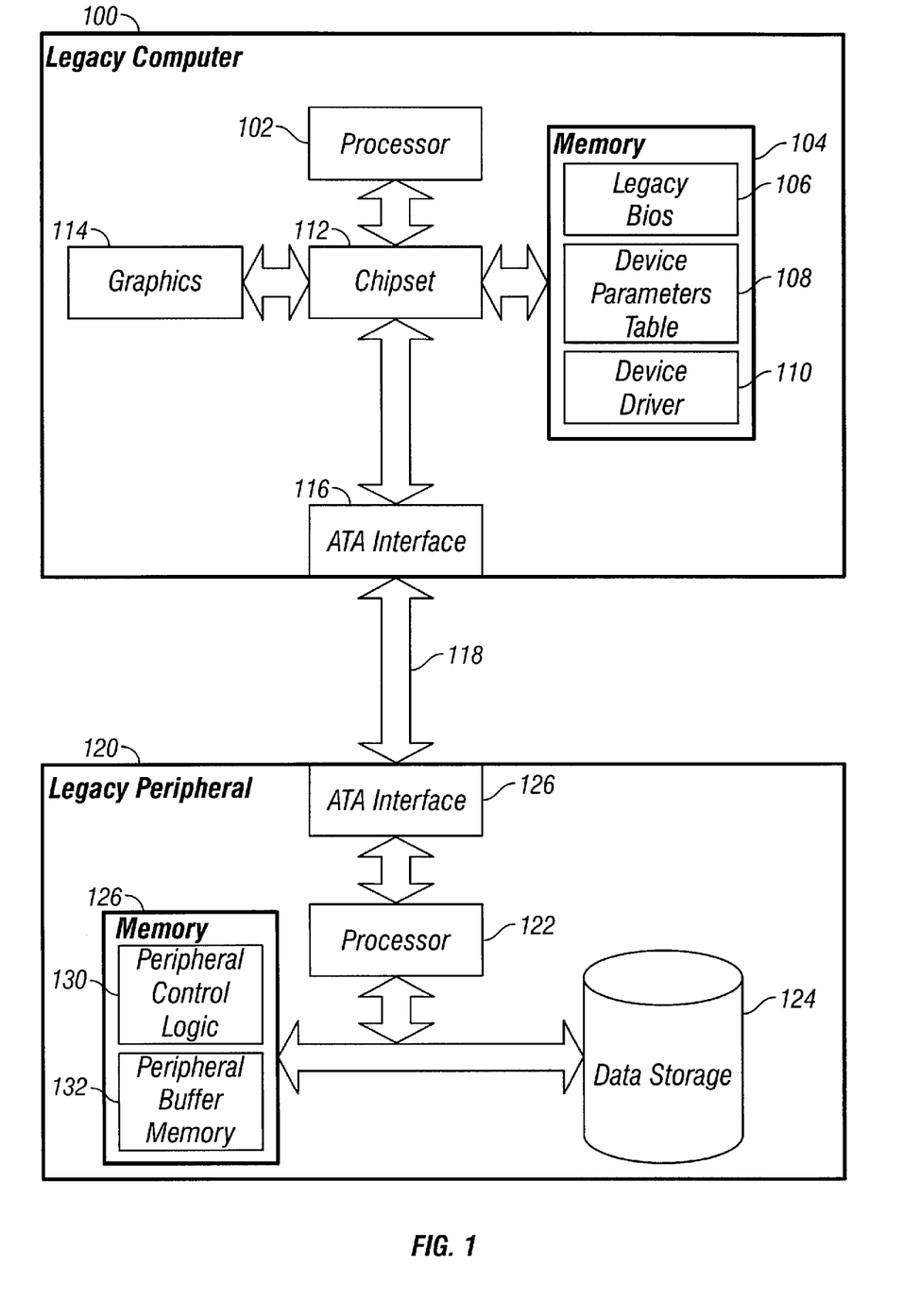
FIG. 1 is a diagram of a legacy computer coupled to a legacy peripheral.

Referring to FIG. 1, a legacy peripheral 120 is coupled to a legacy computer 100 via a cable 118. The legacy peripheral 120 includes data storage 124 (e.g., a hard disk platter, hard disk, and disk head), a processor 122, and memory 126. The peripheral memory 126, in accordance with traditional computer/peripheral schemes, stores peripheral control logic 130 instructions that control peripheral functions such as data caching and block management. Also in accordance with traditional computer/peripheral schemes, peripheral memory 126 includes a peripheral buffer 132 for storing cached data. The peripheral 120 further includes ATA interface 126 hardware for connecting the peripheral 120 to the computer 100. Communication between the peripheral 120 and the computer 100 is handled by the ATA interface 126 and by peripheral control logic 130 instructions executed by the processor 122.

The computer 100 includes a processor 102 (e.g., a Pentium™ CPU), memory 104, and a chipset 112 that includes logic and electronics that interconnect the processor 102, memory 104, and other components such as a graphics card 114. The computer 100 includes other customary components (e.g., an I/O controller, buses, and a system clock) (not shown). The computer 100 also includes ATA interface 116 hardware for communicating with coupled peripherals.

The computer memory 104 stores device driver instructions 110, legacy BIOS (Basic Input/Output System) instructions 106, and a device parameters table 108 that stores data-storage characteristics (e.g., number of useable sectors and number of cylinders) of coupled peripherals. The BIOS 106 and device driver 110 can refer to the device parameters table 108 to provide peripheral 120 services to other programs (e.g., a word processor). The legacy BIOS 106 can build the device parameters table 108 during system initialization.

Figure 2:
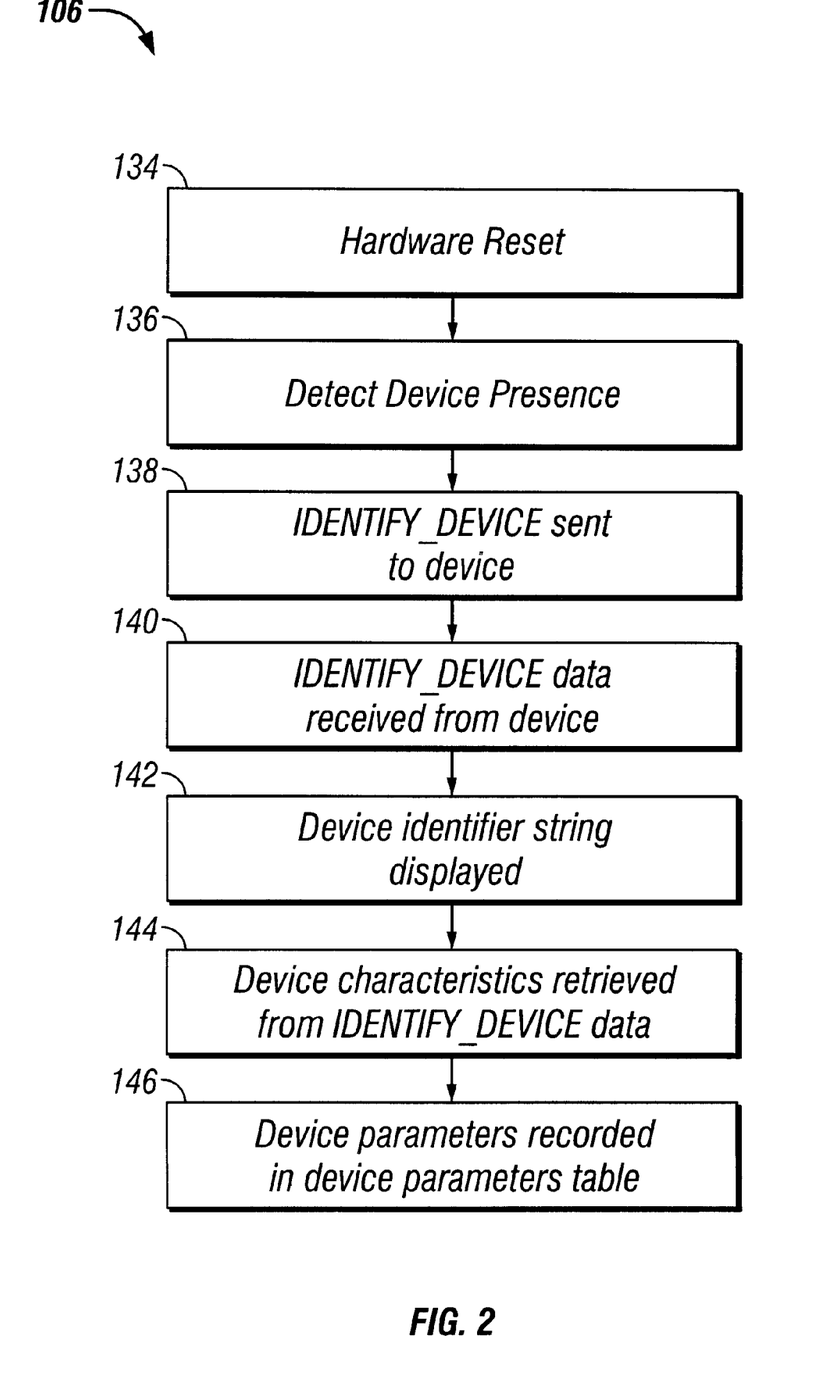
FIG. 2 is a flow chart of legacy BIOS (Basic Input/Output System).

Referring to FIG. 2, when a computer is turned on, the legacy BIOS 106 may have no knowledge of the characteristics of coupled peripherals. To determine the characteristics of coupled peripherals after a hardware reset (134), the legacy BIOS 106 can scan I/O ports to detect coupled peripherals (136). The legacy BIOS 106 then transmits an ATA IDENTIFY_DEVICE request to each detected peripheral (138). The BIOS 106 expects ATA peripherals to return an ATA IDENTIFY_DEVICE reply describing the peripheral's characteristics. After receiving the reply (140), the BIOS 106 can display information included in the reply to a user (142) (e.g., a device identifier string) and update (146) the device parameters table 108 with peripheral characteristics retrieved from the IDENTIFY_DEVICE reply (144).

Figure 3:
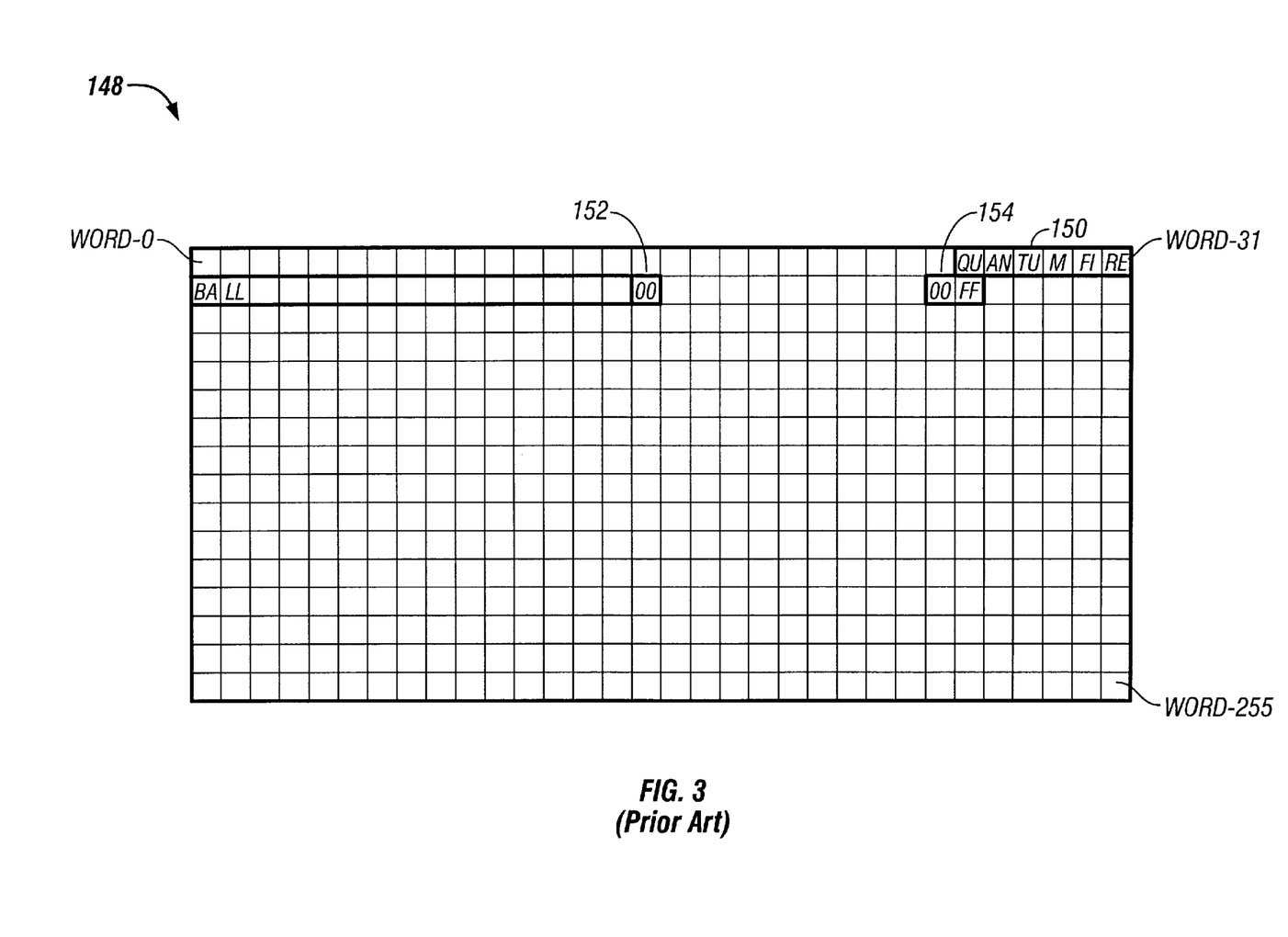
FIG. 3 is a diagram of an IDENTIFY_DEVICE reply.

Referring to FIG. 3, the ATA standard defines an IDENTIFY_DEVICE reply 148 as a 256-word data structure. Different 2-byte words in the data structure are designated for storage of different peripheral data-storage characteristics. For example, the contents of word-56 and word-57 154 are designated for storage of a binary coded number indicating the number of useable (e.g., undamaged) data storage sectors available on the device. The reply 148 stores a wide variety of other data-storage characteristics (e.g., number of peripheral cylinders). The ATA standard also reserves some portions (e.g., word-48 152) of the reply 148 for future use. To comply with the ATA standard, a peripheral must set the bits in reserved words to all zeroes. Some devices set the bits in reserved words to all ones, despite the ATA standard. The standard further designates Word-27 to word-41 150 for storage of an ASCII (American Standard Code for Information Interchange) string that identifies the peripheral model. As shown in FIG. 3, an IDENTIFY_DEVICE reply 148 describes a "Quantum Fireball" having 255 (00FF in hexadecimal) useable sectors. Legacy BIOS 106 can store this and other information in the device parameters table 108.

Figure 4:
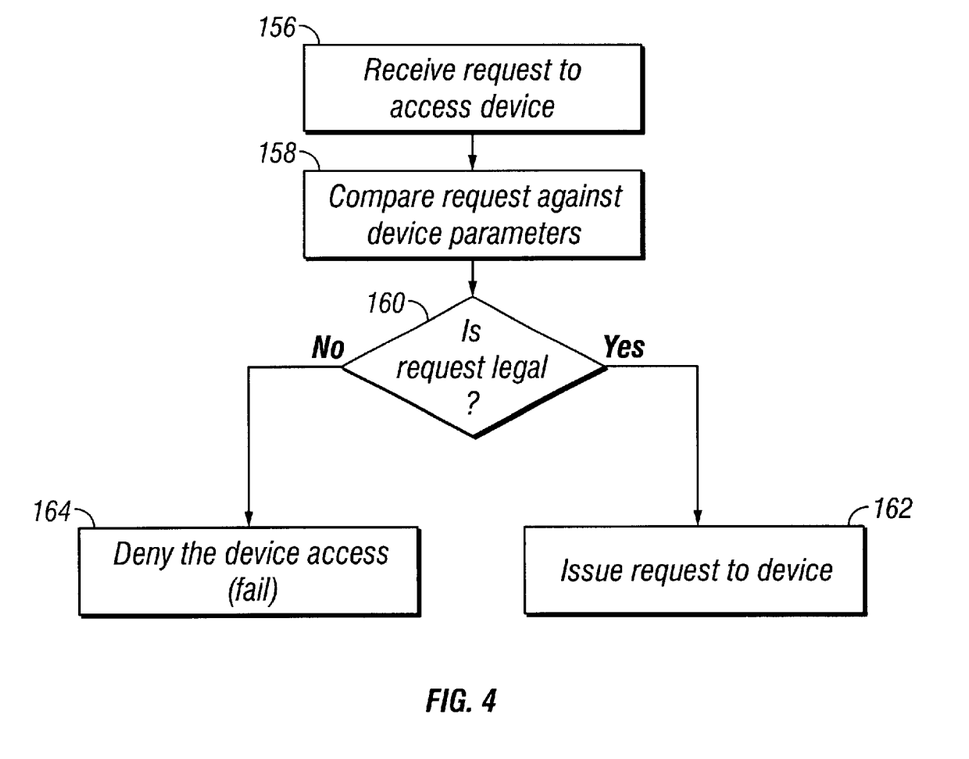
FIG. 4 is a flow chart of attempted peripheral use.

Referring to FIG. 4, when BIOS 106 or a device driver 110 receives a request to use (e.g., read or write data) a peripheral (156), the BIOS 106 or device driver 110 can examine the characteristics of the peripheral stored in the device parameters table 108 (158). If the characteristics indicate the peripheral can service the request (160) the request can be forwarded to the peripheral (162). For example, if a read request for sector-254 is made for a peripheral that reported 255 useable sectors in an IDENTIFY_DEVICE reply, the peripheral will be used (162) to read the requested data. However, if a peripheral reported having zero useable sectors in an IDENTIFY_DEVICE reply, the peripheral would not be used (164) since the device parameters table 108 would indicate the device could not perform the requested function (e.g., the sector requested is greater than the total number of sectors reported). Peripheral characteristics other than the number of useable sectors are also considered in validating requests for device use, for example, whether a peripheral is locked for security purposes or is a read-only device. Both of these characteristics are also reported by a peripheral in the IDENTIFY_DEVICE reply.

Figure 5:
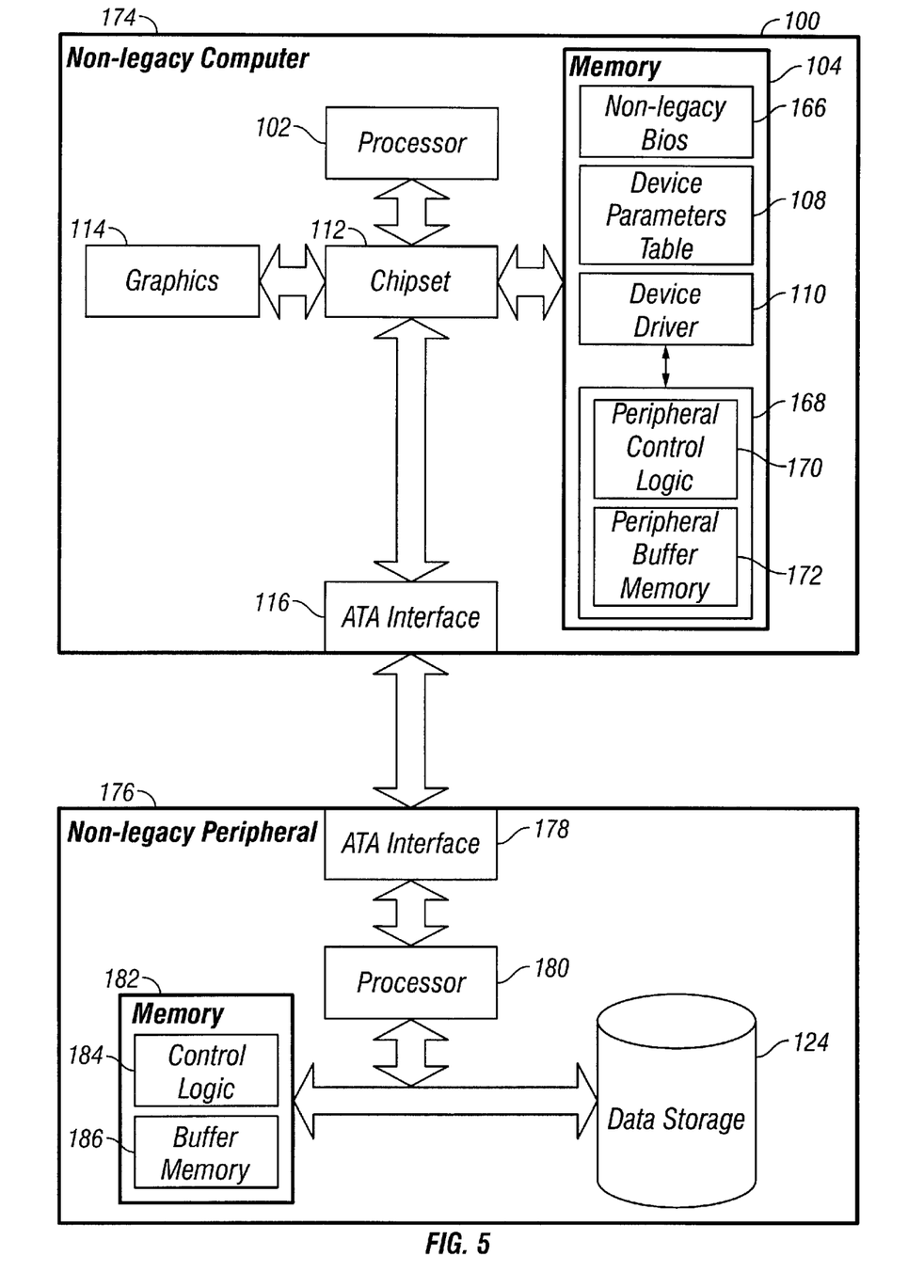
FIG. 5 is a diagram of a non-legacy computer coupled to a non-legacy peripheral.

Referring to FIG. 5, a non-legacy peripheral 176 is coupled to a non-legacy computer 174. The computer 174 and peripheral 176 can use one of the the proposed computer/peripheral schemes instead of one of the traditional computer/peripheral schemes.

The non-legacy computer 174 can include a similar processor 102 and memory 104 as legacy computers 100 (FIG. 1). However, to implement one of the proposed computer/peripheral schemes, the memory 104 of the non-legacy computer 174 stores instructions for non-legacy BIOS 166 and, after being uploaded from the peripheral 176, peripheral-specific instructions 168 for handling functions traditionally handled by peripherals in the older computer/peripheral schemes. These instructions 168 can include portions of the peripheral control logic 170 and a portion of the peripheral buffer memory 172 traditionally stored and executed by the peripheral.

The non-legacy peripheral 176, freed from performing many functions performed by legacy peripherals 120, can include a less sophisticated processor 180 and less memory 182 than its legacy counter-part. The scheme also creates an opportunity to increase device performance since the host, in general, has more available resources (e.g., amount of memory and processor speed) than the peripheral. The non-legacy peripheral 176 memory 182 includes a reduced set of peripheral control logic 184 instructions and a reduced area for peripheral buffer memory 186. The peripheral 176 also includes ATA interface 178 hardware and control logic 184 that executes instructions that take advantage of the predictable way legacy BIOS 106 processes the ATA IDENTIFY_DEVICE reply. The instructions 178, 184 configure the reply to both identify a non-legacy peripheral 176 to a non-legacy computer 174 and prevent unpredictable behavior when a non-legacy peripheral 132 is coupled to a legacy computer 100.

Figure 6:
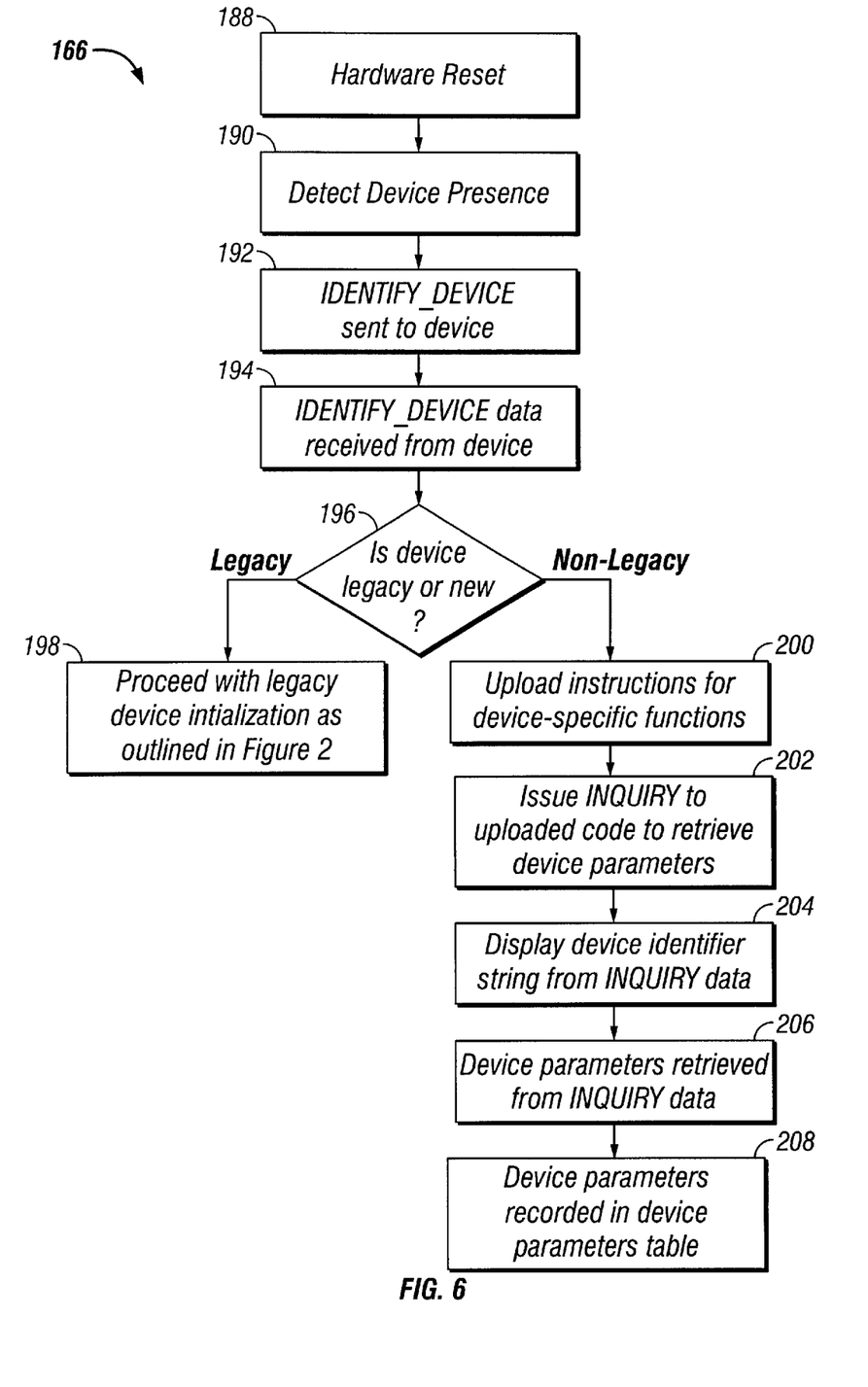
FIG. 6 is a flow chart of non-legacy BIOS.

Referring to FIG. 6, the non-legacy BIOS 166 can be designed to use both legacy 120 and non-legacy 176 peripherals. Initially, however, the non-legacy BIOS 166 may not know which kind of device is coupled. To determine the type of peripheral coupled, the non-legacy BIOS 166 can issue an ATA IDENTIFY_DEVICE command (192). Both the legacy 126 and non-legacy 178 peripherals respond to an ATA IDENTIFY_DEVICE command by returning an IDENTIFY_DEVICE reply. The non-legacy peripherals 176, however, include different data in the reply than specified by the ATA standard. For example, as is described in more detail below, the non-legacy peripherals 176 can include bits in a reserved word (e.g. word-48) to identify the non-legacy peripheral 178 as such to a non-legacy computer 174. Thus, based on the information in the received reply (194), the non-legacy BIOS 166 can determine whether a legacy 120 or non-legacy 176 peripheral is coupled (196) to the computer 174.

If the non-legacy BIOS 166 determines a legacy peripheral 120 is coupled (198), the non-legacy BIOS 166 handles the peripheral 120 in the same manner as the legacy BIOS 106. That is, the non-legacy BIOS 128 displays selected contents of the reply to a user and updates the device parameters table. If the non-legacy BIOS 166 determines a non-legacy peripheral 174 is coupled, the non-legacy BIOS 166 uploads the peripheral-specific functions stored on the non-legacy peripheral 176 for execution by the non-legacy computer 174 (200). The non-legacy BIOS 166 need not use any other information included in the reply since the equivalent information can be obtained via the uploaded functions (202–208).

Figure 7:
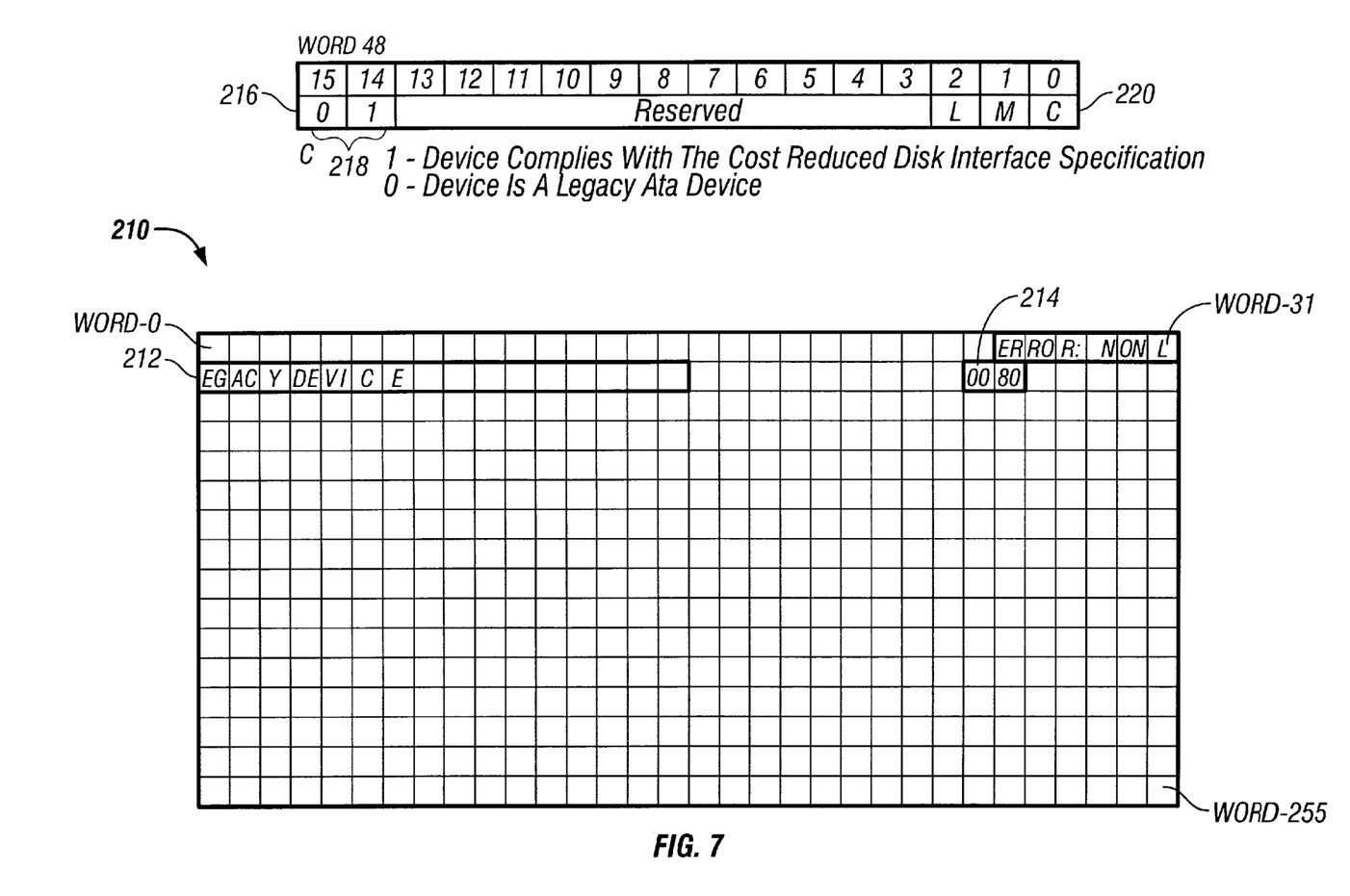
FIG. 7 is a diagram of an IDENTIFY_DEVICE reply produced by a non-legacy peripheral.

Referring to FIG. 7, as described above, the ATA IDENTIFY_DEVICE reply 210 produced by a non-legacy peripheral 176 includes data that identifies the non-legacy peripheral 176 as such to a non-legacy computer 174. As shown, the nonlegacy peripheral can use word-48 216 of the reply 210. Of course, any other word reserved for future use by the ATA standard could be used. Legacy BIOS 106 instructions generally ignore the contents of reserved words. As stated previously, ATA compliant peripherals set the bits in reserved words to all zeroes, but some otherwise compliant peripherals set the bits in reserved words to all ones. Thus, one way to reliably identify a peripheral as a non-legacy peripheral 176 is to include a mix of ones and zeroes in a selected reserved word. As shown, the non-legacy peripherals 176 set bit-14 to zero and bit-15 to one 218 to identify the reserved word 216 as including information not provided by legacy peripherals 120. The non-legacy peripherals 176 further set bit-0 220 of the word to one. The selection of both the reserved word and the bits set within the selected reserved word are arbitrary.

Beyond being used to identify itself as a non-legacy device 176 to a non-legacy computer 174, the reply 210 can be configured to produce a controlled failure mechanism in legacy computers 100 by taking advantage of the predictable way in which legacy BIOS 106 processes the information in a reply 210. For example, a non-legacy peripheral 176 can set the contents of words 214 to falsely indicate the number of useable sectors as being zero instead of including an accurate count of the number of useable sectors. The non-legacy peripheral 176 includes this information based on the known behavior of a legacy computer 100. That is, the peripheral 176 assumes that a legacy computer will determine the number of sectors available in a device and deny use of a peripheral that reports having no useable sectors. Because the IDENTIFY_DEVICE command is typically the first information exchanged between a computer and peripheral, the non-legacy peripheral 176 can prevent all attempted use of the device 176.

Instead of falsely reporting that the peripheral has no useable sectors, the peripheral can falsely report other data-storage characteristics. For example, the peripheral can falsely report that the device is locked for security purposes or that the device is a read-only device.

The non-legacy peripheral 176 can also include information in the reply 210 that notifies a user that a coupled peripheral 176 is not defective or improperly coupled, but is instead potentially incompatible. For example, instead of using words 27–41 214 to store ASCII characters that describe the peripheral model, the non-legacy peripheral 176 can store an ASCII coded error message (e.g., "Error: Non-Legacy Dev."). Because legacy BIOS 106 usually displays the information in words 27–41 214 to a user during system initialization, the user is promptly notified that an coupled peripheral 176 is incompatible with the user's computer.

The reply 210 returned by a non-legacy peripheral 176, though conforming with the format of the ATA standard (e.g., the length of reply and the data-types of information included in the reply), includes content that both results in a controlled failure mechanism in legacy computers and notifies a non-legacy computer that the device 176 can use the proposed computer/peripheral scheme. The non-legacy peripheral 176, therefore, can use a similar reply to respond to any received IDENTIFY_DEVICE command, although the invention is not limited in scope in this respect.

Figure 8:
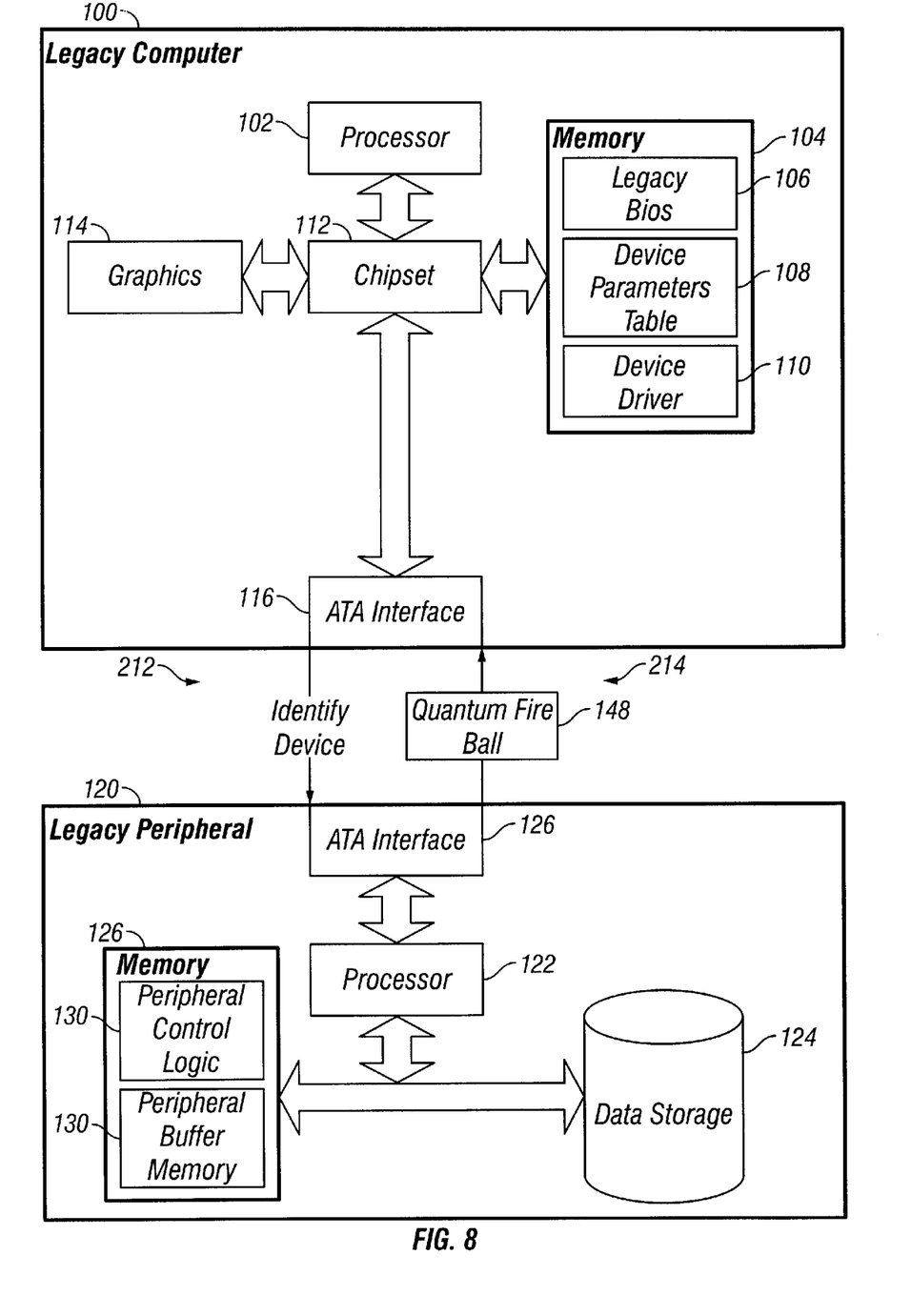
FIG. 8 is a flow diagram of an exchange between a legacy computer and a legacy peripheral.

FIGS. 8–12 summarize the different possible interactions between legacy and non-legacy computers and peripherals. Referring to FIG. 8, a legacy peripheral 120 is coupled to a legacy computer 100. The legacy BIOS 106 causes the computer 100 to transmit an ATA IDENTIFY_DEVICE command (212) to the peripheral 120. In response, the peripheral 120 sends back a reply 148 including information describing the peripheral characteristics (214). The legacy BIOS 106 stores this information in the device parameters table 108 to control use of the peripheral 120.

Figure 9:
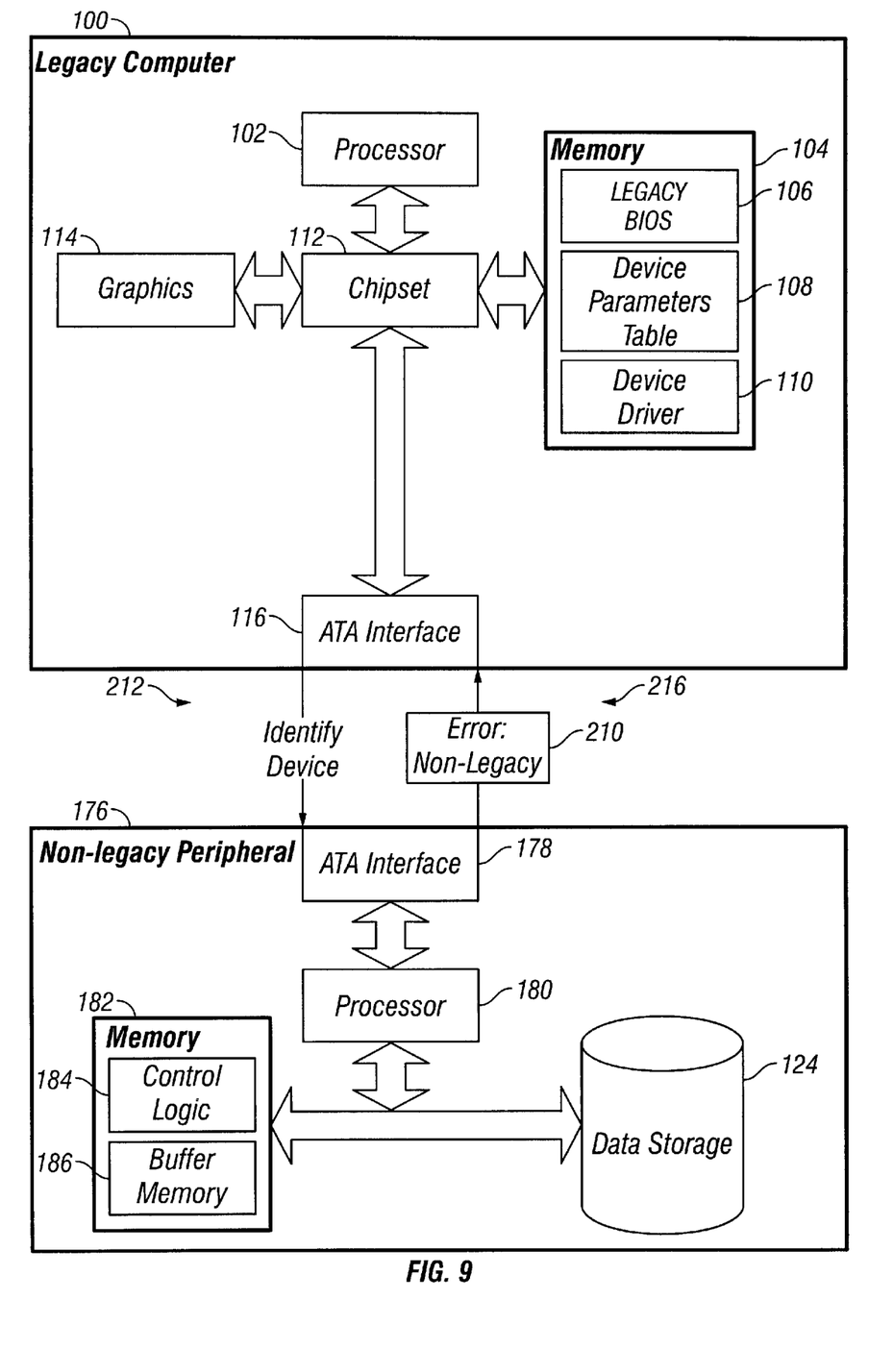
FIG. 9 is a flow diagram of an exchange between a legacy computer and a non-legacy peripheral.

Referring to FIG. 9, a non-legacy peripheral 176 is coupled to a legacy computer 100. The legacy BIOS 106 results in the computer transmitting an ATA IDENTIFY_DEVICE command (212) to the peripheral 176. The non-legacy peripheral 176 sends back a reply 210 indicating the peripheral 176 should not be used (216) (e.g., no useable sectors). The legacy BIOS 106 stores the information in the device parameters table 108. Based on this information, use of the peripheral 176 is denied. The reply 210 also includes an ASCII error message which the legacy BIOS 106 displays to a user during system initialization.

Figure 10:
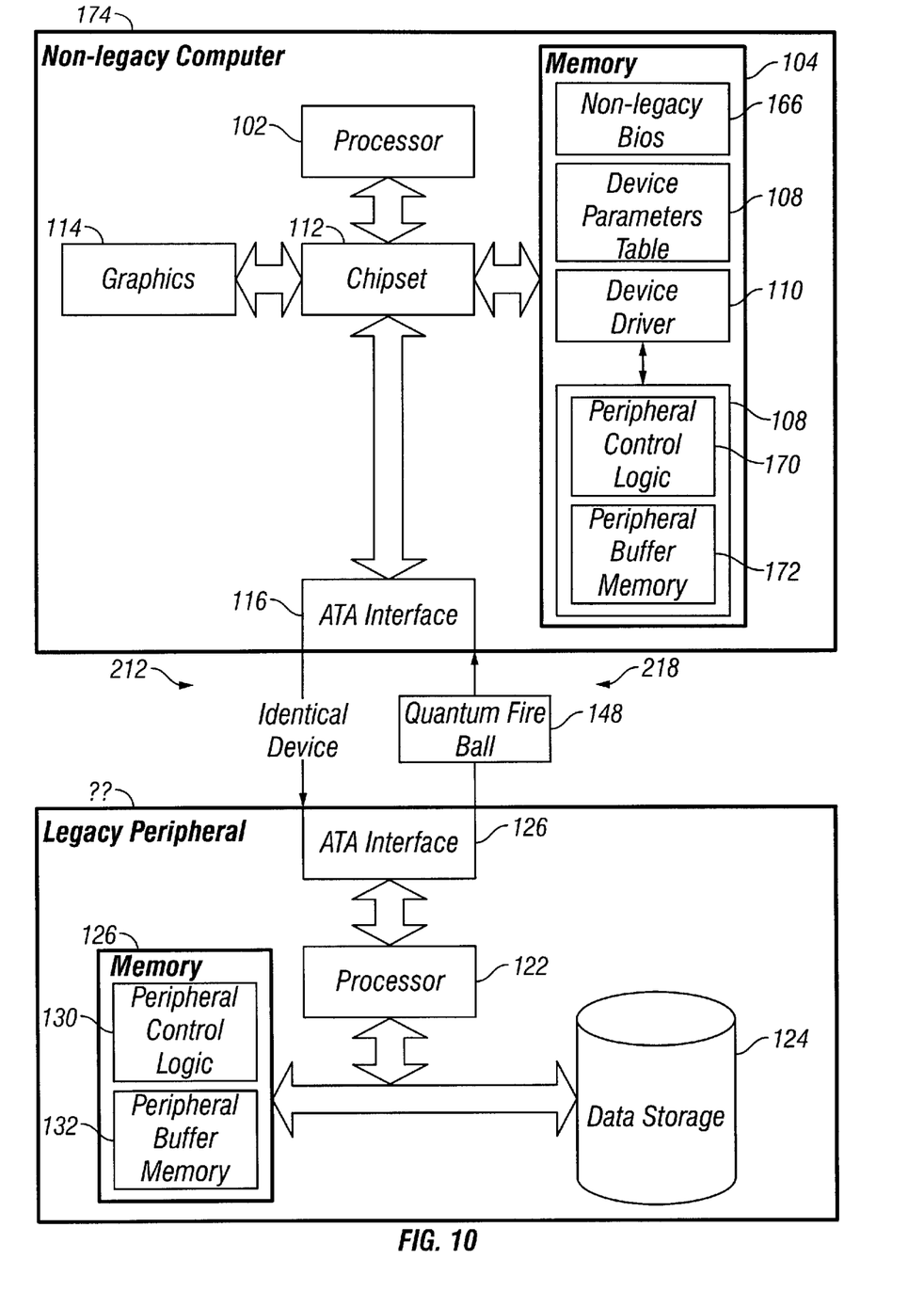
FIG. 10 is a flow diagram of an exchange between a non-legacy computer and a legacy peripheral.

Referring to FIG. 10, a legacy peripheral 120 is coupled to a non-legacy computer 174. The non-legacy BIOS 166 causes the computer 175 to transmit an ATA IDENTIFY_DEVICE command (212). The legacy peripheral 120 sends back a reply 148 identifying the peripheral's characteristics (218). The non-legacy BIOS 128 stores this information in the device parameters table 108 and handles the peripheral in accordance with the traditional computer/peripheral schemes.

Figure 11:
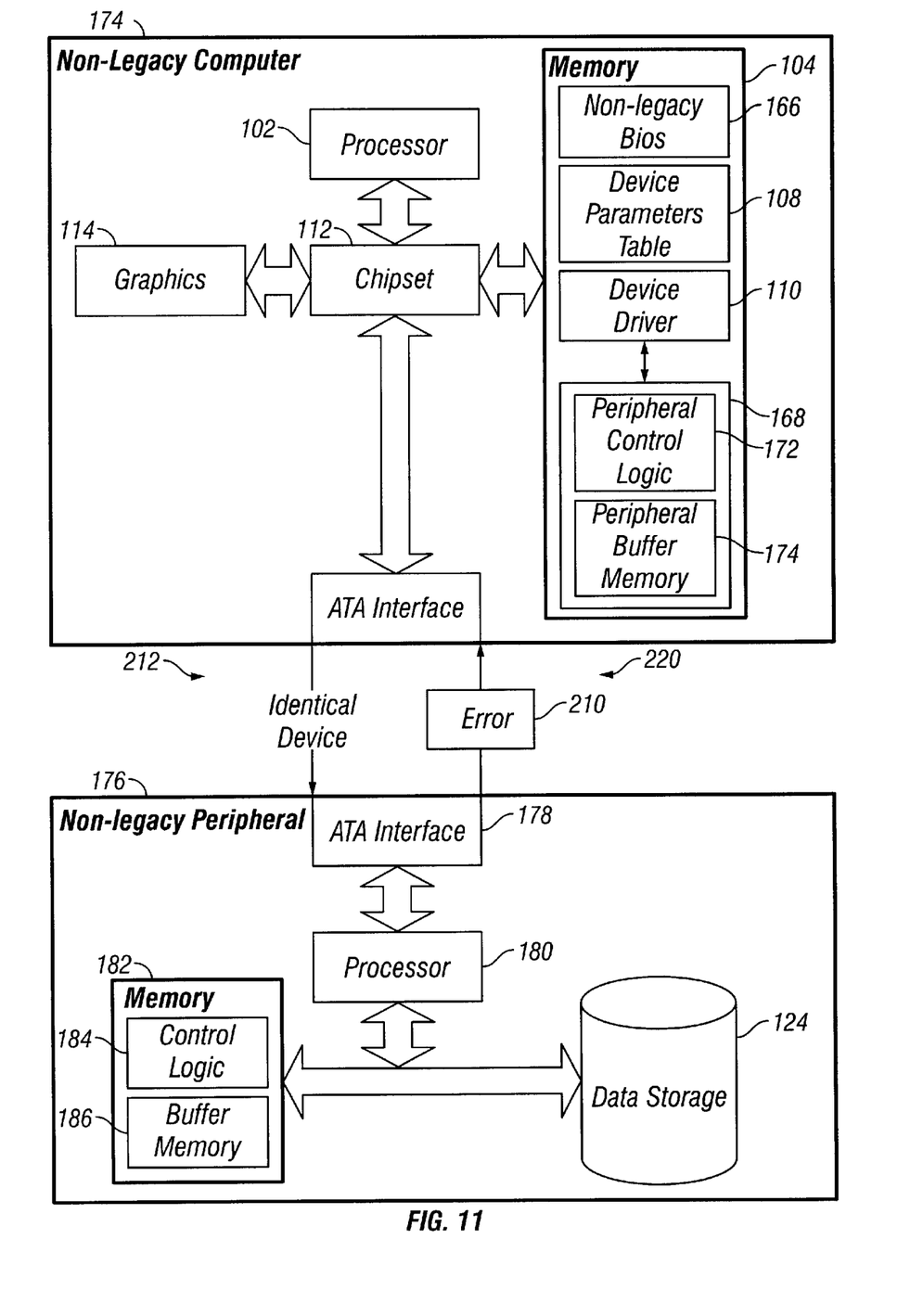
FIG. 11 is a flow diagram of an exchange between a non-legacy computer and a non-legacy peripheral.

Referring to FIG. 11, a non-legacy peripheral 176 is coupled to a non-legacy computer 174. The non-legacy BIOS 166 transmits an ATA IDENTIFY_DEVICE command 212 to the peripheral 176. The peripheral replies (220) with a reply 210 that includes information (e.g., bits in word-48) that identifies the device as a non-legacy peripheral. Based on the reply, the non-legacy BIOS transmits a request to the peripheral to upload (not shown) peripheral-specific function instructions 168 to the computer 174. The computer 174 stores the uploaded instructions in memory 104 and uses the instructions in accordance with the proposed computer/peripheral schemes.

Other embodiments are within the scope of the following claims. For example, non-legacy peripherals can respond to commands other than the IDENTIFY_DEVICE command by returning a bad status value. However, because the ATA IDENTIFY_DEVICE command is usually the first command issued to a peripheral during system initialization, using an IDENTIFY_DEVICE reply can avert incompatibility problems before any use of a peripheral by a computer. In addition, information within the IDENTIFY_DEVICE reply other than the number of useable sectors can be altered to cause a legacy computer to deny requests for use of the peripheral.

Although described in conjunction with schemes that allocate function execution between peripherals and computers, the mechanisms described can be used by any peripheral that wishes to disable use by a potentially incompatible computer.

What is claimed is:

1. A method, comprising:
    receiving a request at a peripheral for information describing at least one data-storage characteristic of the peripheral; and
    without error, transmitting a reply including information falsely describing at least one data-storage characteristic.

2. The method of claim 1 wherein the request comprises an IDENTIFY_DEVICE request.

3. The method of claim 1 wherein the reply comprises information formatted as an IDENTIFY_DEVICE reply.

4. The method of claim 1 wherein the data-storage characteristic comprises useable sectors of the peripheral.

5. The method of claim 1 wherein the information falsely describing at least one data-storage characteristic comprises information falsely describing the peripheral as having no useable sectors.

6. The method of claim 1 further comprising including information in the reply that identifies a computer/peripheral scheme that does not rely on information included in the reply to determine data-storage characteristics.

7. The method of claim 6 wherein including information in the reply that identifies the scheme comprises configuring a portion of the reply reserved for future use by a standard.

8. The method of claim 7 wherein configuring the portion of the reply comprises storing at least one "1" bit and at least one "0" bit in the portion.

9. The method of claim 1 further comprising including an error message in the reply.

10. A method comprising:
   receiving an IDENTIFY_DEVICE request at a peripheral for information describing at least one data-storage characteristic of the peripheral; and
   without error, transmitting an IDENTIFY_DEVICE reply having information that falsely describes the peripheral as having no useable sectors and includes information included in a reserved portion of the IDENTIFY_DEVICE reply that identifies the peripheral as configured for use in a computer/peripheral scheme.

11. A method comprising:
   receiving a request at a peripheral from a computer for information; and
   transmitting a reply to the request that will cause a computer using a first computer/peripheral scheme and being incapable of identifying a second computer/peripheral scheme, not to use the peripheral and a computer using the second computer/peripheral scheme to use the peripheral.

12. The method of claim 11 wherein the request comprises an IDENTIFY_DEVICE request.

13. The method of claim 11 wherein the first scheme comprises a scheme that does not upload peripheral functions to the computer for execution.

14. The method of claim 11 wherein the second scheme comprises a scheme that uploads peripheral functions to the computer for execution.

15. The method of claim 11 wherein the information comprises information that falsely describes at least one peripheral data-storage characteristic.

16. The method of claim 15 wherein the data-storage characteristic comprises a number of useable sectors.

17. The method of claim 11 wherein the information comprises information indicating the peripheral has zero useable sectors.

18. The method of claim 11 wherein the information comprises a text error message.

19. The method of claim 11 wherein the information comprises information indicating that the peripheral complies with the second scheme.

20. A method comprising:
   receiving an IDENTIFY_DEVICE request at a data-storage peripheral from a computer; and
   responding to the IDENTIFY_DEVICE request by, without error, transmitting a reply having an indication that falsely describes the peripheral as having no useable sectors and an indication that the peripheral is configured for use in a scheme that uploads peripheral function instructions for execution by the computer.

21. A method comprising:
   transmitting a request for information to a peripheral from a computer conforming to a first computer/peripheral scheme and being incapable of identifying a second computer/peripheral scheme, to a peripheral conforming to the second computer/peripheral scheme; and
   receiving a reply from the peripheral in response to the request, the reply including information that causes the computer not to use the device.

22. The method of claim 21 wherein the reply message includes a text error message.

23. The method of claim 21 further comprising displaying the text.

24. A computer program product, disposed on a computer readable medium, including instructions that cause a processor to:
   transmit a request for information to a peripheral; and
   based on a reply received from the peripheral, determine whether the peripheral conforms to a first or second computer/peripheral scheme, the second computer/peripheral scheme having been developed after the first computer/peripheral scheme, wherein the reply would cause a legacy computer, which is incapable of identifying the second computer/peripheral scheme, to not use the peripheral if the peripheral uses the second computer/peripheral scheme.

25. The computer program product of claim 24 wherein the first scheme comprises a scheme that does not upload peripheral functions to the computer for execution and the second scheme comprises a scheme that does upload peripheral functions to the computer for execution.

26. The computer program product of claim 24 wherein the computer instructions are included in BIOS (Basic Input/Output System) instructions.

27. A computer program product, disposed on a computer readable medium, including instructions for causing a processor to:
   receive a request at a peripheral for information describing at least one data-storage characteristic of the peripheral; and
   without error, transmit a reply including information falsely describing at least one data-storage characteristic of the peripheral.

28. A computer program product, disposed on a computer readable medium, including instructions for causing a processor to:
   receive a request at a peripheral from a computer for information; and
   transmit a reply to the request that will cause a computer using a first computer/peripheral scheme and being incapable of identifying a second computer/peripheral scheme, not to use the peripheral and a computer using the second computer/peripheral scheme to use the peripheral.

29. A system comprising:
   a computer for executing instructions that transmit a request for information to a peripheral, and based on a reply received from the peripheral, determine whether the peripheral conforms to a first or second scheme; and
   a peripheral configured for use in the second scheme, the peripheral including instructions for transmitting a reply to the request that will result in the computer handling the peripheral in accordance with the second scheme and that would result in a legacy computer, which is incapable of identifying the second scheme, not using the peripheral.

\* \* \* \* \*